United States Patent
Long

(10) Patent No.: US 7,104,171 B1
(45) Date of Patent: Sep. 12, 2006

(54) TOOLHOLDER AND TOOLHOLDER ASSEMBLY FOR A CUTTING INSERT POSITIONED AT A NON-CONVENTIONAL HEIGHT

(75) Inventor: William M. Long, Blairsville, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/128,836

(22) Filed: May 14, 2005

(51) Int. Cl.
*B23B 29/04* (2006.01)

(52) U.S. Cl. .............................. 82/158; 82/160; 407/11

(58) Field of Classification Search ................ 82/1.11, 82/159, 901, 160, 161; 407/5, 11; 279/20
See application file for complete search history.

(56) References Cited

U.S. PATENT DOCUMENTS

| | | | |
|---|---|---|---|
| 3,808,656 A | | 5/1974 | Lindskog |
| 4,848,199 A | * | 7/1989 | Kelm ........................... 82/159 |
| 4,890,523 A | * | 1/1990 | Satran ........................... 82/158 |
| 4,951,536 A | * | 8/1990 | Robertson ..................... 82/158 |
| 5,388,487 A | | 2/1995 | Danielsen |
| 5,417,131 A | * | 5/1995 | Robertson ..................... 82/158 |
| 5,555,784 A | | 9/1996 | Muendlein et al. |
| 5,718,156 A | | 2/1998 | Lagrolet et al. |
| 5,829,331 A | | 11/1998 | Mori |
| 5,846,033 A | * | 12/1998 | Biberman ................... 407/107 |
| 5,961,259 A | * | 10/1999 | Ziegler ....................... 408/181 |
| 6,270,293 B1 | | 8/2001 | Erickson et al. |
| 6,299,388 B1 | | 10/2001 | Slabe |
| 6,443,672 B1 | | 9/2002 | Lagerberg |
| 6,786,119 B1 | | 9/2004 | Erickson et al. |
| 2002/0127067 A1 | | 9/2002 | Lagerberg |
| 2003/0082018 A1 | | 5/2003 | Kraemer |

OTHER PUBLICATIONS

Morse Cutting Tools, "Turning Tools—Square Shank Boring Tools" Brochure, http://www.morsecuttingtools.com/turningtoools/4200tsa.html, at least as early as Nov. 9, 2004.
Morse Cutting Tools, "Turning Tools—Side Cutting Offset Tools" Brochure, http://www.morsecuttingtools.com/turningtools/4180.html, at least as early as Nov. 9, 2004.
LMT-Fette, Inc., "Point Blank" advertisement, http://www.lmtfette/New%20 Products/Point%20blank.htm, at least as early as Nov. 12, 2004.
LMT-Fette, Inc., "Testing the Limits" Advertisement, http://www.lmtfeete.com/New%20 Products/LMTProdlineAd.jpg, at least as early as Nov. 12, 2004.
LMT-Fette, Inc., "Point Blank—Direct Flow Coolant Turning Holder Kits", Product Brochure, at least as early as Nov. 24, 2004.

* cited by examiner

*Primary Examiner*—Willmon Fridie, Jr.
(74) *Attorney, Agent, or Firm*—Larry R. Meenan

(57) ABSTRACT

A toolholder has a conventional square shank body with a pocket extending downwardly from the top surface of the body so that the cutting tip of an insert mounted within the pocket is positioned below the top surface of the square shank body. This permits the pocket to have a back wall through which coolant may be introduced and directed against the cutting insert. Typically, the cutting tip of a conventional square shank toolholder is aligned with the top surface of the toolholder. Additionally, a toolholder assembly is disclosed which includes a plurality of such toolholders.

13 Claims, 5 Drawing Sheets

TOOLHOLDER AND TOOLHOLDER ASSEMBLY FOR A CUTTING INSERT POSITIONED AT A NON-CONVENTIONAL HEIGHT

BACKGROUND OF THE INVENTION

1. Field of the Invention

The subject invention is directed to metal working operations and, in particular, to a toolholder and toolholder assembly adapted to permit a cutting insert to be secured at a non-conventional location within the toolholder.

2. Description of Related Art

During many metal working operations, it is desirable and sometimes necessary, to flush the interface between a cutting tool and the workpiece with coolant to avoid damage to the cutting tool and to the workpiece as a result of high temperatures generated at this interface and chips that may become tangled at this interface. However, depending upon the arrangement by which the cutting insert is held against the workpiece, efficient dispersion of coolant toward this interface area may be difficult, if not impossible, without significantly changing the envelope of the toolholder.

Within the metal cutting industry, the most common hardware for holding a cutting insert during a turning operation is a conventional square shank toolholder. This toolholder has a body which is typically clamped within a machine tool and the portion to be clamped has a cross-section defining four sides of equal length. The most common conventional square shank toolholder bodies have sides wherein the length is less than or equal to 1¼ inches and hereinafter reference to conventional square shank toolholder bodies will be directed to square shank toolholder bodies with the portion to be clamped having each side less than or equal to 1¼ inches. Not only is this size compact, but also permits tool access in many locations and with many machine tools that could not accommodate toolholder bodies with larger shanks. Some conventional square shank toolholders have a front end beyond the portion intended to be clamped and this front end may be larger than the portion to be clamped.

Modular toolholders permit quick insertion and/or removal of a cutting insert mounted upon a tool head. However, as a result of the internal hardware associated with modular tooling, the toolholder bodies for modular tooling must be larger than conventional square shank toolholder bodies. In particular, the minimum shank size for modular toolholder bodies is about 1½ inches. Therefore, modular toolholder bodies take up additional space and must be secured to machine tools in a different manner.

U.S. Pat. No. 6,299,388 discloses a conventional square shank toolholder with a tower extending upwardly from the toolholder through which coolant is directed downwardly upon the cutting insert. Through the introduction of such a tower, the assembly becomes significantly larger than the envelope of just the square shank toolholder and, as a result, this arrangement is not suitable for a variety of different applications in which the toolholder envelope may not exceed that of a conventional square shank toolholder.

U.S. Pat. No. 6,443,672 is directed to a cutting tool utilizing a modular toolholder, such as holder 2, which as previously discussed must be larger than conventional square shank toolholders to accommodate the additional hardware to make it operational. As a result, the width of the shank for a modular toolholder may be twice that of a comparable conventional square shank toolholder.

Typically for machines utilizing conventional square shank cutting tools, the cutting edge of cutting inserts retained in such tooling is located flush with the top surface of the square shank. For example, FIG. 1 illustrates a square shank toolholder 1 having a top surface 3 and a cutting insert 5 mounted within a pocket 7 of the square shank toolholder 1. FIG. 1 is an example of a conventional square shank toolholder with a larger front end, wherein the portion intended to be clamped is square. The insert 5 illustrated in FIG. 1 is indexable and therefore may have usable cutting edges on four sides. For purposes of discussion in this application, references to cutting edges will be to cutting edges oriented within a toolholder ready to engage a workpiece. Cutting edge 8 is one such example. The cutting edge tip 9 is positioned within the toolholder 1 so that during a metalworking operation the tip 9 is the first part of the cutting edge 8 that engages the workpiece. The active cutting edge 8 of the cutting insert 5 is positioned along a line L which overlays a line L1 extending from the top surface 3 of the toolholder 1. Aligning the cutting edge tip 9 of the cutting insert 5 with the top surface 3 of a square shank toolholder 1 is conventional practice within the industry and, as a result, if coolant must be introduced at the interface between the cutting insert 5 and the workpiece, then an arrangement such as the tower previously discussed is necessary. However, as mentioned, a tower attached to the square shank toolholder 1 will create an envelope larger than what is permissible for many applications. Furthermore, a tower on the square shank adds extra steel and overhang length to the tooling.

Modular toolholder configurations for similar operations have been designed, wherein coolant may be introduced through a wall in the pocket of the toolholder. However, these are centerline systems and, as illustrated in FIG. 2, such a toolholder 10 is secured to a flange 12, which is mounted to a machine tool (not shown). A cutting insert 15 is mounted within a pocket 17 within the toolholder 10, wherein the cutting insert 15 has a cutting edge 19. The cutting edge 19 of the cutting insert 15 is located in a plane L3 that passes through the centerline L4 of the connecting joint which, in this case, is the flange 12. The toolholder 10 has a rear wall 20 suitable to accept a bore through which coolant may be directed against the cutting insert 15. While one advantage of such a system is the interchangability of turning and boring cutting inserts for the toolholder 10 used for ID and OD machining operations, a disadvantage of this configuration is that size constraints make it impossible to fit such a centerline system into a small square shank tool envelope. Most modular toolholders require double width slots in order to be applied to a machine tool. That is, the width of the modular toolholder body is twice the width of a comparable conventional square shank toolholder body.

U.S. Pat. No. 5,718,156 is directed to a process for machining titanium parts, wherein, as illustrated in FIGS. 1 and 2 of that patent, the toolholder, which appears to have a square or rectangular shank, has a cutting insert positioned within the top surface of the toolholder to create a recess within the shank. However, a clamp (collar 2) is secured within the recess to hold the insert in place and simultaneously to direct coolant through the clamp against the cutting edge of the tip. Not only is this system fairly complex but, furthermore, the recess within the pocket must be fairly deep to accommodate the space required for the clamp.

SUMMARY OF THE INVENTION

In a first embodiment of the invention, a toolholder comprises a conventional square shank body having a centerline extending therethrough, a front end, a rear end and a top surface. A tool head extends rearwardly from the front end of the shank body. A pocket extends into the tool head downwardly from the top surface of the shank body and rearwardly from the front end of the shank body, wherein the pocket has a wall extending downwardly from the top surface of the shank body. At least a portion of the pocket is adapted to receive a cutting insert and to position a cutting tip of the insert at a predetermined depth within the pocket, wherein the predetermined depth is below the top surface of the shank body. A coolant passageway extends through the shank body into the tool head terminating with at least one coolant discharge port through the pocket wall at a location above the predetermined depth of the cutting tip.

A second embodiment is directed to a toolholder rack assembly comprising a mounting rack partitioned to accept a plurality of toolholders. At least one of the toolholders is comprised of a conventional square shank body having a centerline extending therethrough, a front end, a rear end and a top surface and a tool head extending rearwardly from the front end of the shank body. A pocket extends into the tool head downwardly from the top surface of the shank body and rearwardly from the front end of the shank body, wherein the pocket has a wall extending downwardly from the top surface of the shank body. At least a portion of the pocket is adapted to receive a cutting insert and to position a cutting tip of the insert at a predetermined depth within the pocket, wherein the predetermined depth is below the top surface of the shank body. A coolant passageway extends through the shank body and terminates with at least one coolant discharge port through the pocket wall above the predetermined depth of the cutting tip.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
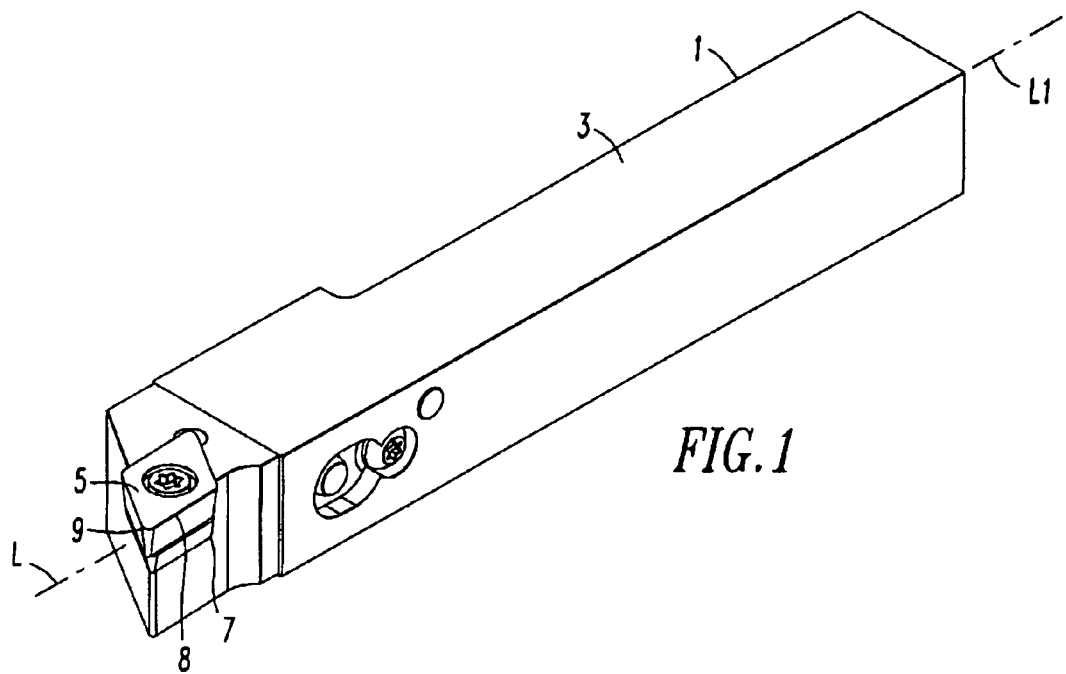
FIG. 1 is a perspective view of a square shank toolholder.
Figure 2:
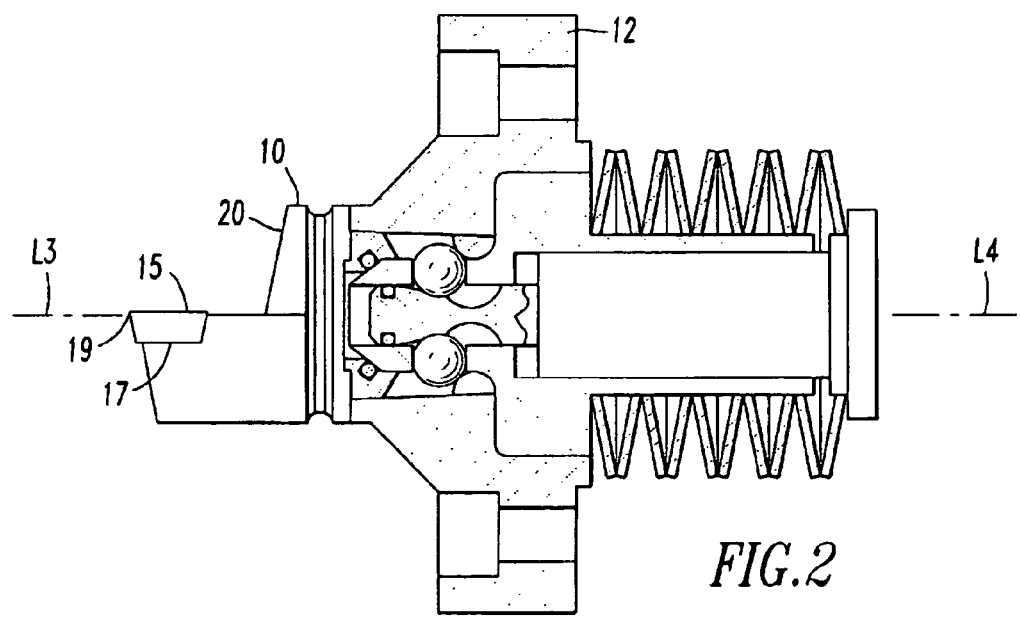
FIG. 2 is a side view of a modular toolholder assembly.

FIGS. 3–7 illustrate different views of one embodiment of the toolholder in accordance with the subject invention. The toolholder 100 is comprised of a shank body 105 having a centerline 107 therethrough, a front end 110, a rear end 113 and a top surface 115. A tool head 120 extends rearwardly from the front end 110 of the shank body 105. A pocket 125 extends into the tool head 120 downwardly from the top surface 115 of the shank body 105 and rearwardly from the front end 110 of the shank body 105. The pocket 125 has a wall 128 extending downwardly from the top surface 115 of the shank body 105. As illustrated by the cross-sectional cutaway in FIG. 4, the toolholder 100 is a conventional square shank toolholder wherein the portion to be clamped within a machine tool is square.

The term tool head may designate a tool head removable from the shank body or a portion of the square shank toolholder formed directly within the square shank body.

At least a portion of the pocket 125 is adapted to receive a cutting insert 130 and position the tip 131 of a cutting edge 133 of the insert 130 at a predetermined depth D within the pocket 125. The predetermined depth D is below the top surface 115 of the shank body 105. This is a significant feature of the subject invention and this feature becomes most beneficial for very small sized toolholders such as non-centerline tooling having a size of one inch or less and capable of being used with a Swiss-style machine.

A Swiss-style machine is a machine tool having an associated toolholder that remains stationary. A rotating workpiece is indexed against the stationary toolholder to initiate a metalworking operation. Because of the versatility of such a machine tool, it is not necessary to position the cutting edge of the insert to be coplanar with the top of the toolholder. As a result, the tip 131 of the cutting insert 130 may be lower than the top surface 115 of the toolholder 100 and the indexing workpiece may be positioned against the cutting insert tip 131 at the appropriate position. With this flexibility, the wall 128 of the pocket 125 may descend from the top surface 115 of the toolholder 100 as far as possible with the limitation that the toolholder portion 102 (FIG. 6) supporting the cutting insert 130 must have sufficient material to support the forces that may be imparted to the cutting insert 130.

A coolant passageway 140 extends through the shank body 105 into the tool head 120 terminating with at least one coolant discharge port 143 through the pocket wall 128 at a location above the predetermined depth D of the cutting edge 133. As illustrated in FIGS. 3–7, the shank body 105 beyond the front end of the toolholder 100 is square. As a result, the shank body 105 fits within an envelope similar to that of a conventional square shank toolholder such as toolholder 1 illustrated in FIG. 1.

Figure 7:
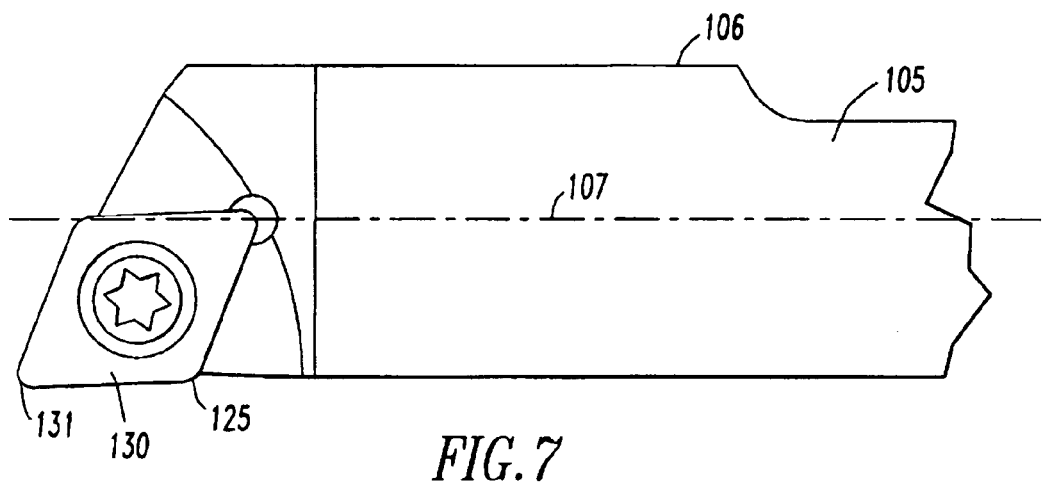
FIG. 7 is a top view of the toolholders illustrated in FIG. 3.

The cutting insert 130 is mounted within the pocket 125. The pocket 125 may be shaped to position the cutting tip 131 offset from the centerline 107 of the shank body 105. This configuration is best illustrated in FIG. 7. Under these circumstances, the shank body 105 has a side 106 and the pocket 125 orients the cutting insert 130 such that the tip 131 of the cutting insert 130 is flush with the side 106 of the shank body 105.

Figure 8:
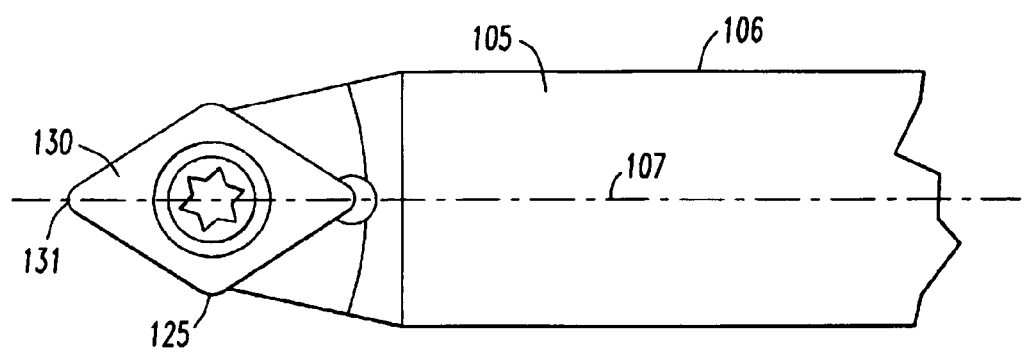
FIG. 8 is a top view of an alternate embodiment of the toolholders illustrated in FIGS. 3–7.

In another embodiment, illustrated in FIG. 8, the pocket 125 positions the cutting insert 130 such that, when viewed in plan, the cutting insert 130 is aligned with the centerline 107 of the shank body.

Figure 6:
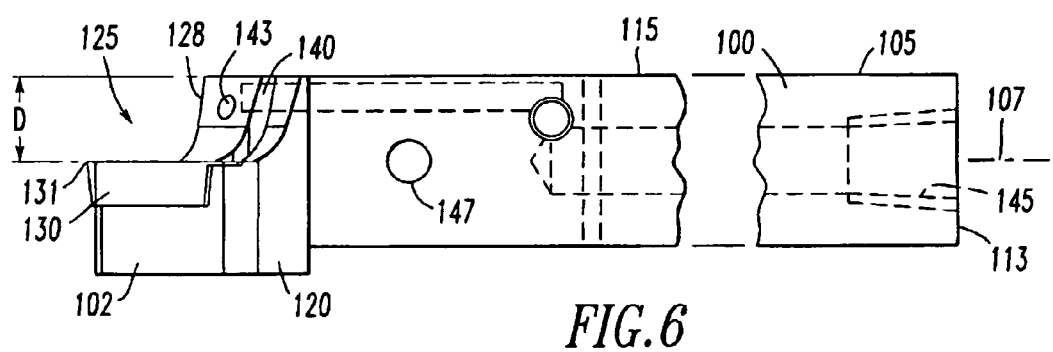
FIG. 6 is a side view of the toolholder illustrated in FIG. 3.

The coolant passageway 140 begins at a coolant supply port 145 (FIG. 6) in the rear end 113 of the shank body 105. The coolant passageway 140 may travel the length of the shank body 105 and into the tool head 120 to the coolant discharge port 143. The tool head 120 may be detachably connected to the shank body 105 and, under such circumstances, the coolant passageway 140 must be aligned at the transition between the tool head 120 and the shank body 105. It is also possible to introduce coolant through a coolant supply port 147 in the side 106 of the shank body 105 as illustrated in FIG. 6. The coolant supply port 147 in FIG. 6 is shown only as an example of where such a port could be located and the internal passageways necessary to transport fluid to the tool head 120 are not shown.

Figure 3:
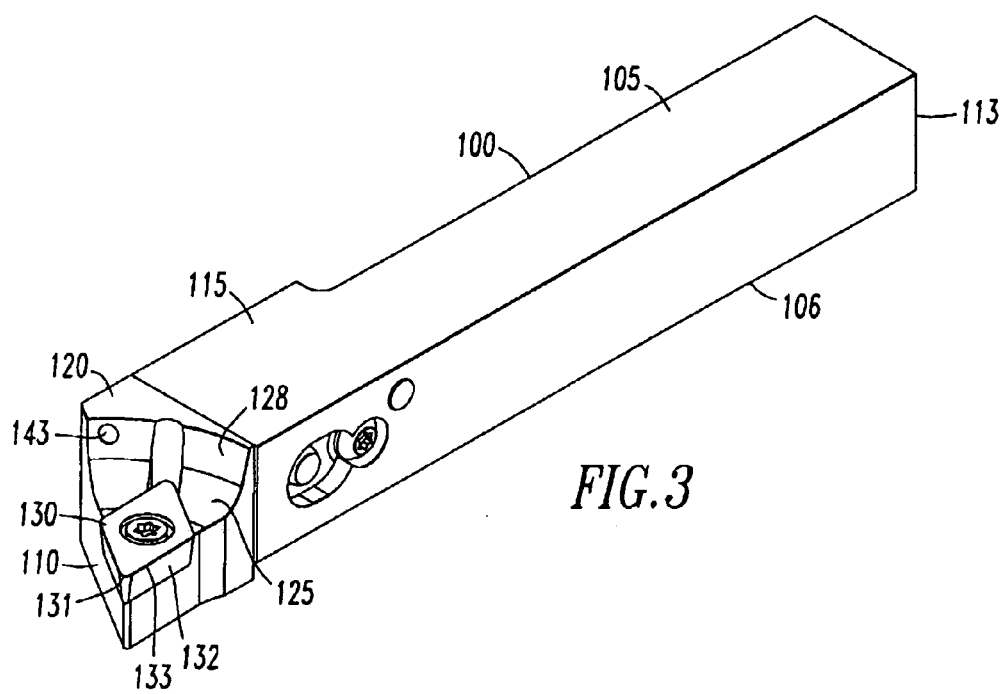
FIG. 3 is a perspective view of a toolholder in accordance with the subject invention.
Figure 4:
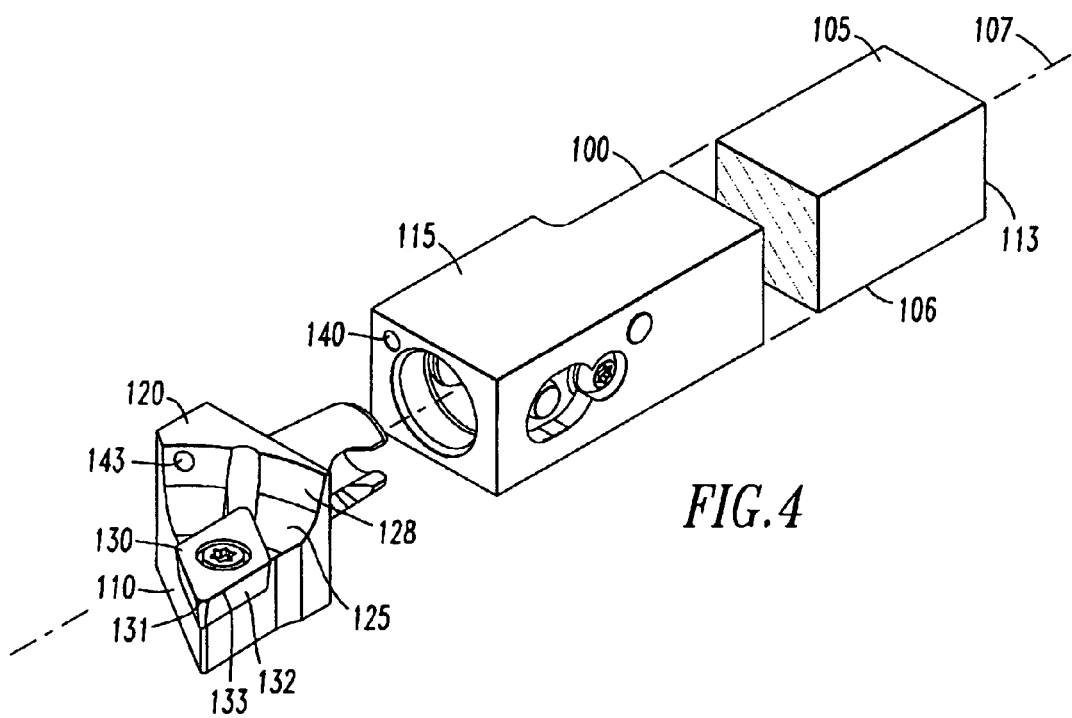
FIG. 4 is an exploded perspective view of the toolholder illustrated in FIG. 3.
Figure 5:
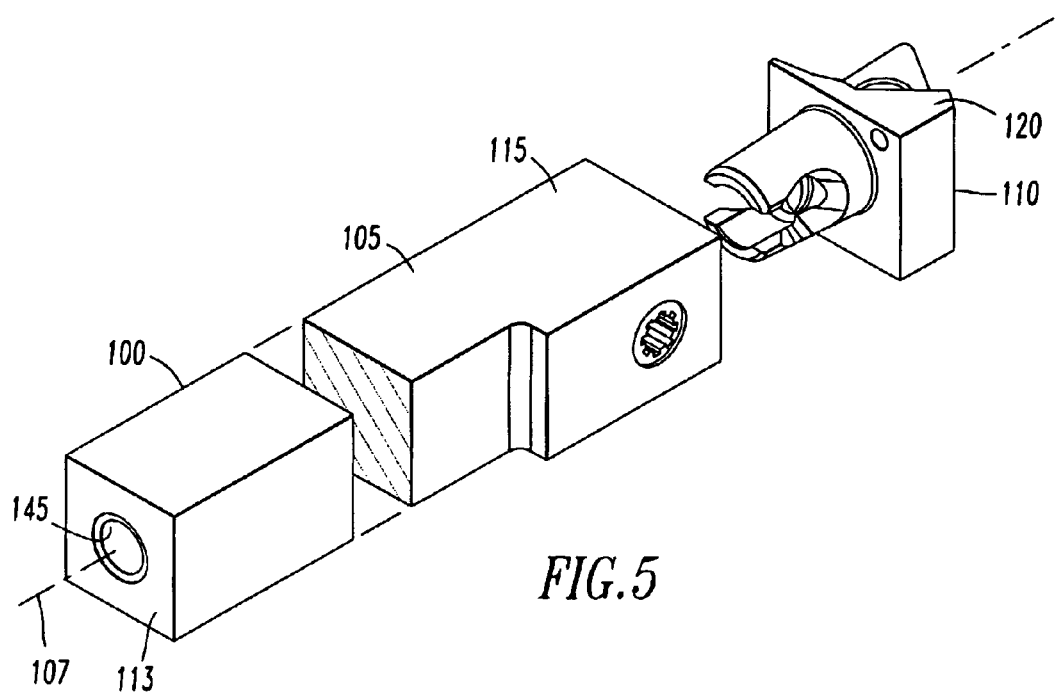
FIG. 5 is an exploded perspective view of the toolholder illustrated in FIG. 3 but rotated 180°.

While FIGS. 3 and 4 illustrate a single coolant discharge port 143, it is entirely possible for the tool head 120 to include multiple coolant discharge ports at select locations within the wall 128 of the pocket 125. These multiple coolant discharge ports 143 may be utilized for opposite end cutting units, neutral tooling, and radial orientation of quick change type clamping units. As a result, the toolholder is capable of accommodating different cutting edge locations. By permitting the tip 131 of the cutting insert 130 to be positioned below the top surface 115 of the toolholder 100, it is possible to keep the overhang length shorter and to provide through-the-tool coolant in a toolholder 100 which fits within the existing conventional square shank envelopes.

The tool head 120 illustrated in FIGS. 3 and 4 is detachable from the remainder of the shank body 105 through a quick change coupling such as that discussed in U.S. Pat. No. 6,786,119 entitled "Toolholder Assembly" and assigned to the assignee of the present invention. The contents of U.S. Pat. No. 6,786,119 are hereby incorporated by reference. It should also be appreciated that, while one particular type of quick-connect coupling has been described in that patent, the subject invention is not limited to this particular type because there are different manufacturers that provide different quick-connect couplings which may also be used with the subject invention.

Figure 9:
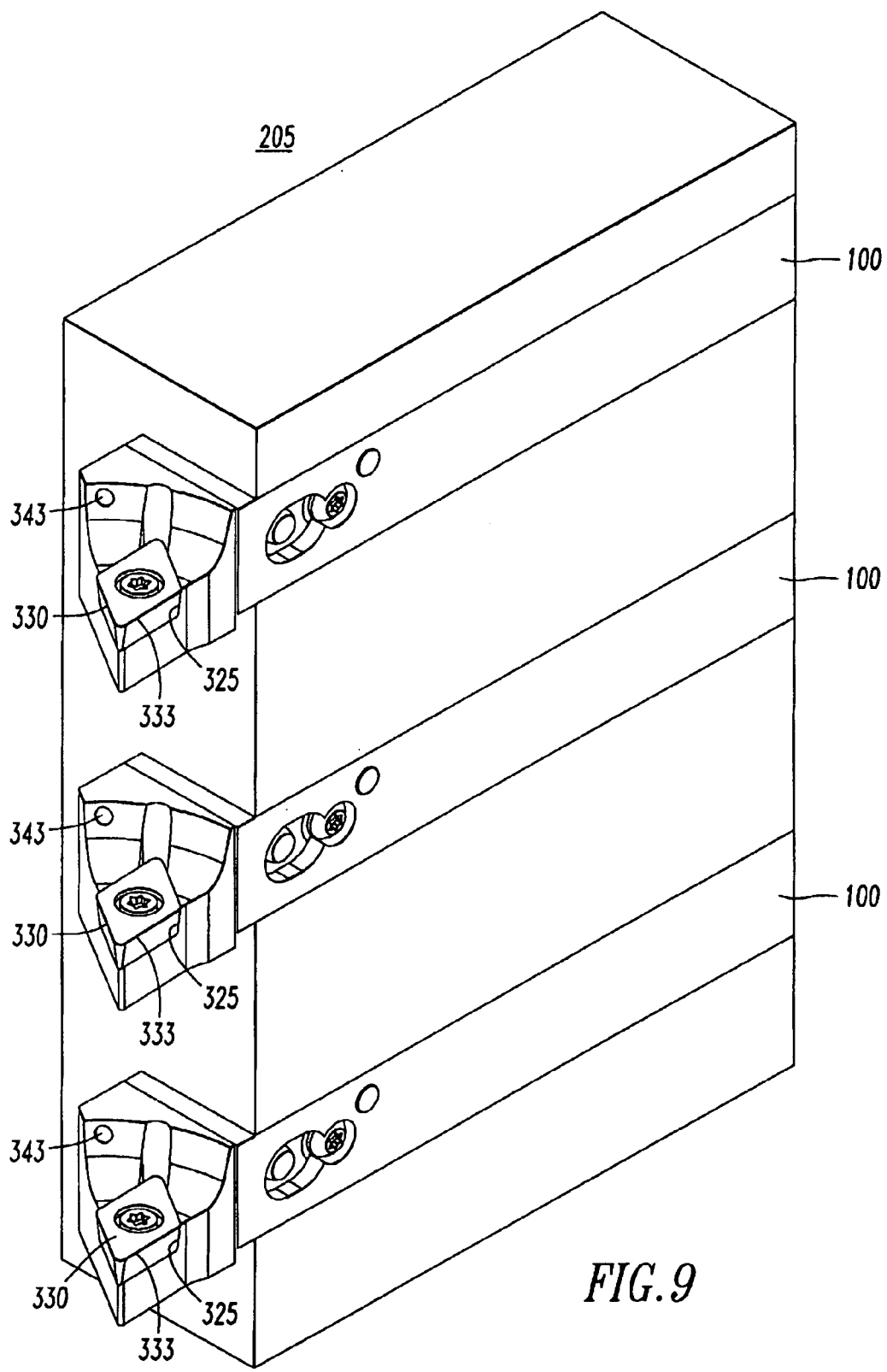
FIG. 9 is a perspective view of a mounting system for multiple square shank toolholders in accordance with the subject invention.

While the toolholder 100 illustrated in FIGS. 3–7 has a removable head 120, it should be appreciated that the shank body 105 of the toolholder 100 may be a continuous uninterrupted piece with a pocket at the front end and an insert mounted therein. The embodiment so far discussed has been a conventional square shank toolholder 100 having a tool head 120 with a cutter pocket 125 having a cutting insert 130 mounted therein. FIG. 9 illustrates a toolholder rack 205 that may be populated at regular intervals by toolholders 100 previously discussed. The rack 205 is particularly suited for use with a Swiss-style machine tool, whereby the workpiece is positioned relative to one of the toolholders 100.

Each toolholder 100 is secured to the mounting rack 205 by mechanisms such as a wedge known to those skilled in the art of metalworking. The toolholders 100 are spaced from one another at regular intervals.

The coolant discharge ports 343 are oriented to direct coolant flow against the cutting edge 333 of an insert 330 mounted within the pocket 325.

Through the subject invention, coolant may be easily routed through a toolholder with the pocket within the front end of the solid shank or a toolholder utilizing a detachably connected head with a connecting joint. This arrangement simplifies sealing the coolant within the assembly and such a feature is especially important in small size toolholder assemblies. Additionally, the depth of the insert edge plane can be selected to provide optimum coolant flow to the edge of the insert. This may be done in a fairly straightforward and simple manner by adjusting the depth of the pocket. Through the use of the features disclosed in the subject invention, the coolant flow direction is simplified since the coolant discharge port is very close to the cutting insert, thereby allowing the coolant discharge ports to direct coolant directly against the cutting insert and greatly simplifying the "aiming" angle.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

The invention claimed is:

1. A toolholder comprising:
   a) a conventional square shank body having a centerline extending therethrough, a front end, a rear end and a top surface;
   b) a tool head extending rearwardly from the front end of the shank body;
   c) a pocket extending into the tool head downwardly from the top surface of the shank body and rearwardly from the front end of the shank body, wherein the pocket has a wall extending downwardly from the top surface of the shank body;
   d) wherein at least a portion of the pocket is adapted to receive a cutting insert and to position a cutting tip of the insert at a predetermined depth within the pocket, wherein the predetermined depth is below the top surface of the shank body;
   e) a coolant passageway extending through the shank body into the tool head terminating with at least one coolant discharge port through the pocket wall at a location above the predetermined depth of the cutting tip; and
   f) wherein the length of a side viewed in a cross-sectional view taken perpendicular to the square shank body centerline is equal to or less than 1¼ inches.

2. The toolholder according to claim 1, further including an insert mounted within the pocket.

3. The toolholder according to claim 2, wherein the pocket positions the insert such that the insert tip is offset from the centerline of the shank body.

4. The toolholder according to claim 2, wherein the shank body has a side and wherein the pocket orients the insert such that the tip of the insert is flush with the side of the shank body.

5. The toolholder according to claim 2, wherein the pocket positions the insert tip such that the insert tip is aligned with the centerline of the shank body.

6. The toolholder according to claim 1, wherein the coolant passageway begins at a coolant supply port in the rear end of the shank body.

7. The toolholder according to claim 1, wherein the coolant passageway begins at a coolant supply port in the side of the shank body.

8. The toolholder according to claim 1, wherein the at least one coolant discharge port is directed toward the location of an insert that is mounted within the pocket.

9. The toolholder according to claim 8, wherein the at least one coolant discharge port is comprised of multiple coolant ports directed toward an insert that is mounted within the pocket.

10. The toolholder according to claim 1, wherein the tool head is formed within the front end of the shank body.

11. The toolholder according to claim 1, wherein the tool head is detachably connected to the shank body.

12. A machine tool assembly comprising:
   a) a mounting rack partitioned to accept a plurality of toolholders; and b) a toolholder mounted thereto, wherein the toolholder is comprised of:
  1) a conventional square shank body having a centerline extending therethrough, a front end, a rear end and a top surface;
  2) a tool head extending rearwardly from the front end of the shank body;
  3) a pocket extending into the tool head downwardly from the top surface of the shank body and rearwardly from the front end of the shank body, wherein the pocket has a wall extending downwardly from the top surface of the shank body;
  4) wherein at least a portion of the pocket is adapted to receive a cutting insert and to position a cutting tip of the insert at a predetermined depth within the pocket, wherein the predetermined depth is below the top surface of the shank body;
  5) a coolant passageway extending through the shank body and terminating with at least one coolant discharge port through the pocket wall above the predetermined depth of the cutting tip; and
  6) wherein the length of a side viewed in a cross-sectional view taken perpendicular to the square shank body centerline is equal to or less than ¼ inches.

13. The machine tool assembly according to claim 12, further includes a cutting insert mounted within the pocket of at least one tool head.

\* \* \* \* \*